United States Patent [19]

Nakamura et al.

[11] Patent Number: 5,070,356

[45] Date of Patent: Dec. 3, 1991

[54] CAMERA HAVING TELEVISION MODE

[75] Inventors: Yoshio Nakamura, Funabashi; Junichi Shinohara, Yokohama; Daisuke Kishida, Kawasaki, all of Japan

[73] Assignee: Ricoh Company, Ltd., Tokyo, Japan

[21] Appl. No.: 592,634

[22] Filed: Oct. 4, 1990

[30] Foreign Application Priority Data

Oct. 9, 1989 [JP] Japan .............................. 1-118504[U]
Jan. 9, 1990 [JP] Japan .................................. 2-376[U]
Jun. 8, 1990 [JP] Japan .............................. 2-61251[U]

[51] Int. Cl.$^5$ .............................................. G03B 7/097
[52] U.S. Cl. ........................................ 354/439; 354/76
[58] Field of Search ............... 354/435, 436, 437, 439, 354/75, 76

[56] References Cited

U.S. PATENT DOCUMENTS

| | | | |
|---|---|---|---|
| 4,325,614 | 4/1982 | Grimes .................................. | 354/435 |
| 4,354,748 | 10/1982 | Grimes et al. ........................ | 354/435 |
| 4,494,846 | 1/1985 | Kurosu et al. ........................ | 354/435 |
| 4,648,701 | 3/1987 | Ogihara et al. ....................... | 354/439 |
| 4,708,454 | 11/1987 | Kodaira et al. ....................... | 354/435 |
| 4,730,202 | 3/1988 | Watanabe et al. .................... | 354/435 |
| 4,978,991 | 12/1990 | Farrington ............................ | 354/436 |

FOREIGN PATENT DOCUMENTS 60-254027 12/1985 Japan .

Primary Examiner—Russell E. Adams
Attorney, Agent, or Firm—Oblon, Spivak, McClelland, Maier & Neustadt

[57] ABSTRACT

A camera having a television mode has a shutter unit for opening and closing a plurality of shutter blades used as a shutter and a diaphragm by rotating a step motor in normal and reverse directions; a photometric device for performing a photometric operation with respect to a photographed object; a mode switching device for selectively switching a television mode for photographing a picture image on a television screen and a normal mode for performing a normal photographing operation; a trigger switch for outputting an open signal in synchronization with an operation for opening the shutter blades and outputting a closed signal in synchronization with an operation for closing the shutter blades; and a calculator for calculating an exposure amount by photometric information provided by the photometric device when the normal photographing mode is selected by the mode switching device. The calculator converts the calculated exposure amount to a time from a generating time point of the open signal of the trigger switch to a time point of the reverse rotation of the step motor so as to control a program exposing operation with respect to the shutter unit. The calculator calculates the exposure amount by the photometric information provided by the photometric device when the television mode is selected.

9 Claims, 12 Drawing Sheets

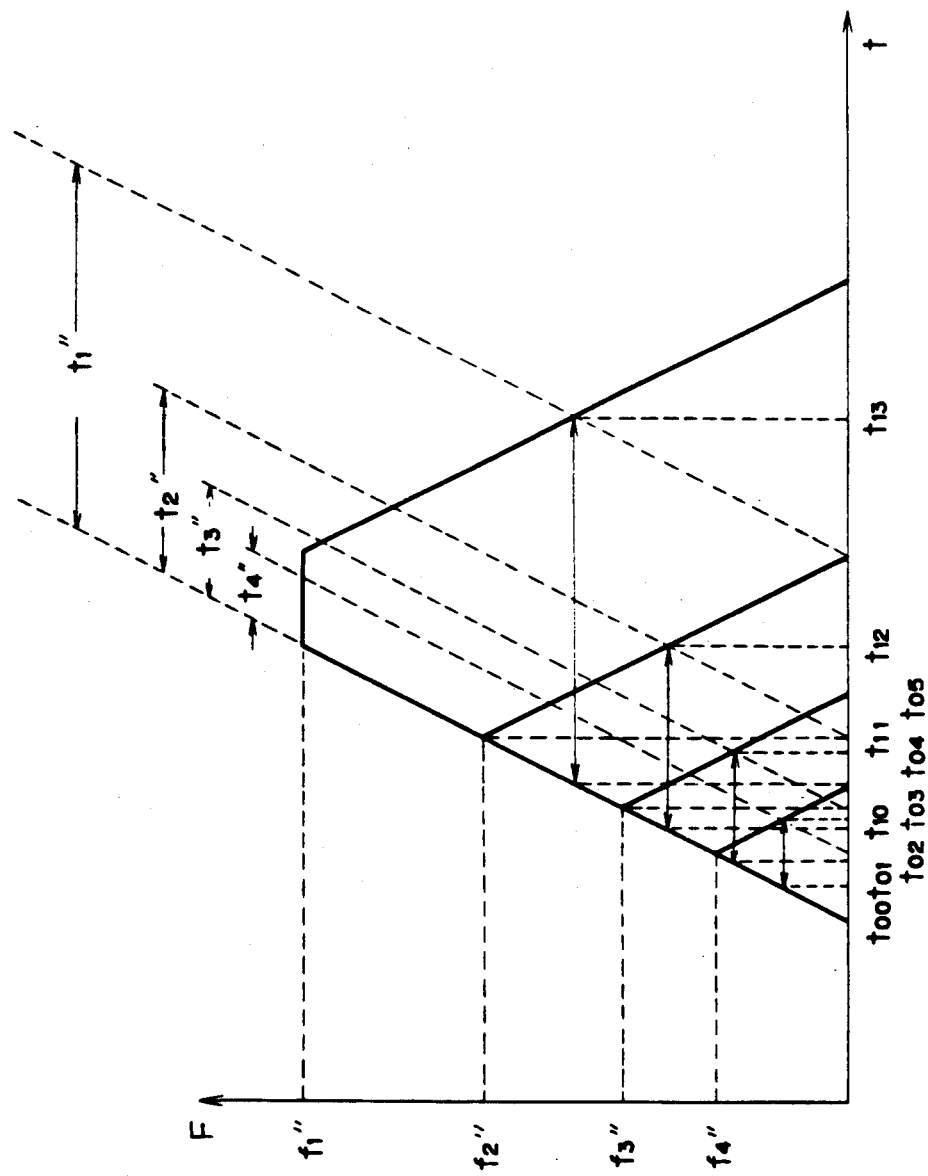

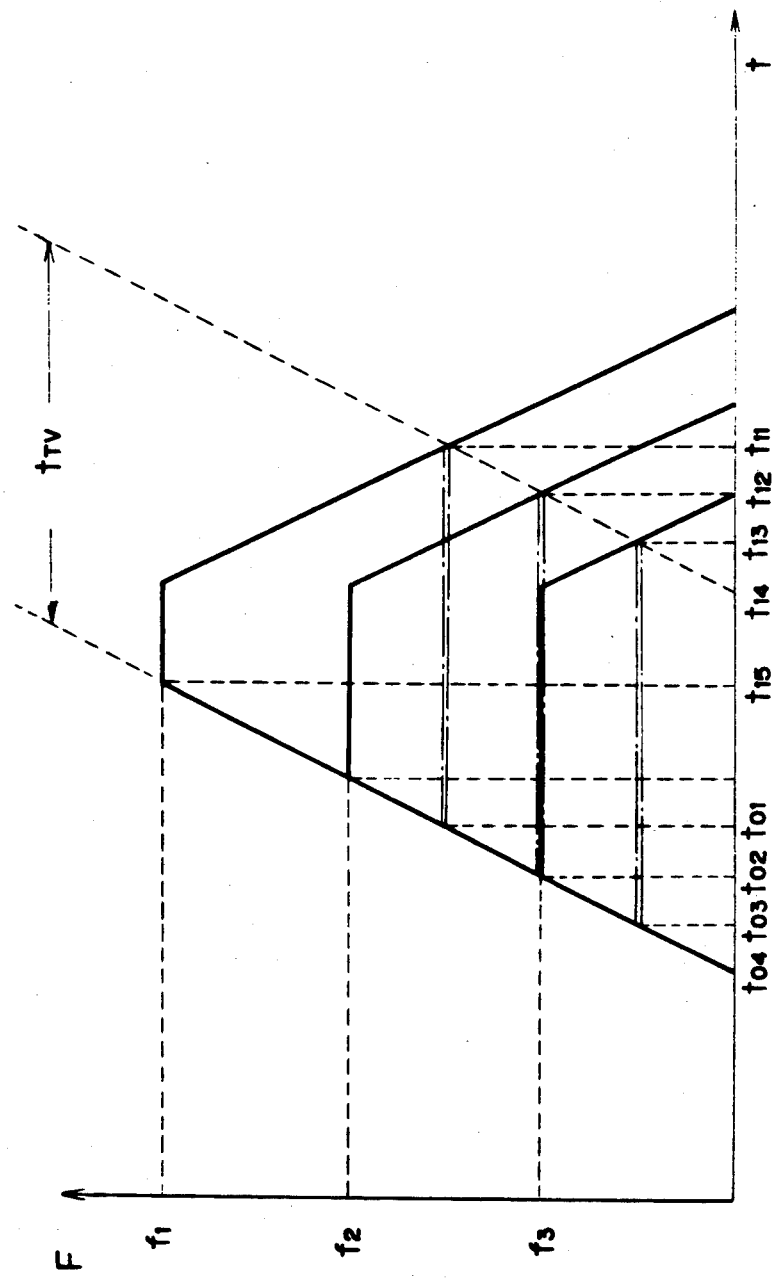

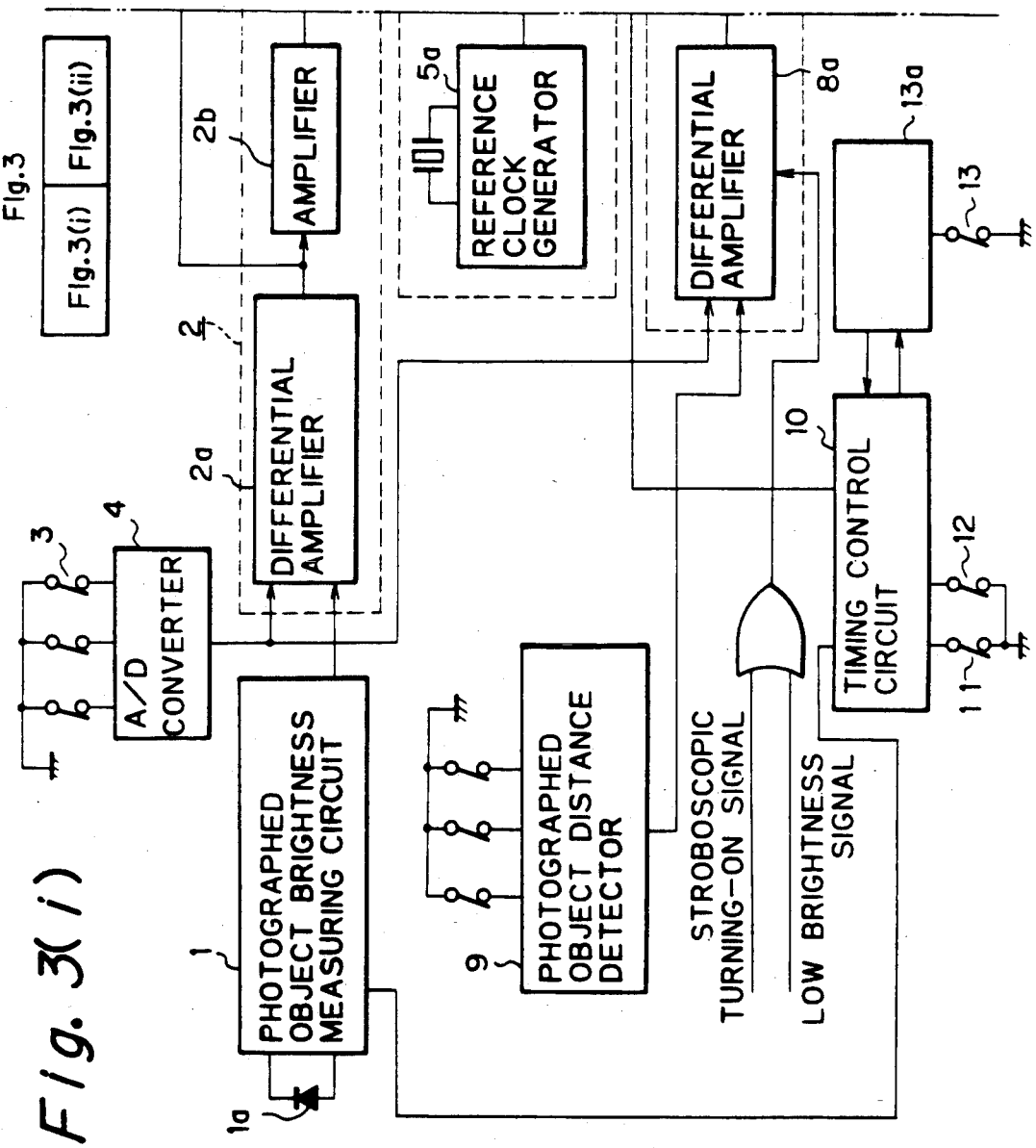

CAMERA HAVING TELEVISION MODE

BACKGROUND OF THE INVENTION

1. Field of the Invention

The present invention relates to a camera having a television mode. More particularly, the present invention relates to a camera having a normal mode for photographing a normal photographed object and a television mode suitable for photographing a picture image on the television screen such that both the modes can be selectively switched.

2. Description of the Related Art

A picture image displayed on a display screen of a cathode-ray tube of television is formed by dividing this image by 262.5 scanning lines. A first scanning operation is preformed for 1/60 second. At a second scanning time, the picture image is scanned by 262.5 scanning lines between the scanning lines in the first scanning operation. Thus, one picture image is formed on the television screen by using a total of 525 scanning lines and a total of scanning times 1/30 second.

In such a jump scanning system, when the picture image on the television screen is photographed, it is necessary to set a shutter time 1/60 second for completing the first scanning operation on the entire television screen, 1/30 second for completing the second scanning operation, or an integral multiple thereof. When the picture image is exposed at a shutter time except for 1/60 second, 1/30 second or the integral multiple thereof, there is a case in which the image has no central portion and partially has a bright band by overlapping the scanning lines with each other.

In a compact camera provided with a lens shutter of a program AE system, etc., when a picture image on the television screen is photographed, shutter speed and diaphragm are shifted by the change in brightness of the picture image on the television screen. Accordingly, when the picture image on the television screen is bright, the shutter speed is high so that the picture image on the televisiion screen cannot be suitably photographed.

Therefore, there is a camera having a function for switching a normal mode to a photographing mode for photographing the picture image on the television screen and such a camera is commerically sold.

When a mode change-over switch in this camera is switched to the photographing mode for photographing the picture image on the television screen, the shutter speed is set to a speed suitable for photographing the picture image on the television screen.

Japanese Patent Application Laying Open (KOKAI) No. 60-254027 shows a circuit for controlloing a program shutter. This control circuit has a sector for forming a lens aperture and a step motor rotated in normal and reverse directions to open and close this sector. The control circuit further has motor control data storing means for setting a step driving number corresponding to an exposure amount and an interpolating amount as data and storing the exposure amount in accordance with an address. The control circuit further has pulse generating circuit means for generating a step driving pulse and a closk pulse. The control circuit further has first counting means for presetting the step driving number before the sector is opened and the step motor is rotated in the reverse direction. The number of driving steps is counted down by the first counting means by the step driving pulse from the pulse generating means. The control circuit further has second counting means for presetting the interpolating amount data before the first counting means is counted up. A counting-down operation of the second counting means is performed by the clock pulse. The control circuit further has reverse rotation driving means for detecting a time point at which the second counting means is counted up and rotating the motor in the reverse direction. The control circuit further has a control section provided with motor driving means for driving the motor by a pulse from the pulse generating circuit means.

When a picture image on the television screen is generally photographed by a camera using a focal plane shutter, the operation of this camera is controlled by setting the shutter speed to a constant value and using the results of an exposure processing based on photometric information with respect to hte diaphragm of a lens.

In the camera having a function for switching the normal mode to the photographing mode for photographing a picture image on the television screen, only the shutter speed is set to a value suitable for photographing the picture image on the television screen when the television mode for photographing this picture image is set. However, an exposure value is constant irrespective of ISO information of a film and photometric information. Accordingly, the exposure value does not corresponed to the brightness of the picture image on the television screen. Therefore, there is a case in which the picture image is photographed at excessive and insufficient exposure amounts.

Further, in the control circuit of a program shutter proposed in Japanese Patent Application Laying Open (KOKAI) No. 60-254027, only a proportional relation between the diaphragm and the shutter can be controlled. Accordingly, when the picture image on the television screen is photographed, the operation of the shutter is controlled in only a state in which the ISO information and the photometric information are neglected and the exposure amount is constant. Therefore, similar to the above-mentioned camera, there is a case in which the picture image on the television screen cannot be photographed at a suitable exposure amount.

In the above camera using the focal plane shutter, the operations of the shutter and the diaphragm must be independently controlled and the structure of the camera is complicated, thereby increasing the cost of the camera.

In the case of a shutter having a plurality of diaphragm blades and having shutter and diaphragm functions, the shutter is completely opened in three steps after a trigger switch is turned on. When the number of steps from the beginning of an opening operation of the shutter to a complete opening state thereof at the normal photographing time is not set to be large at a designing time of the camera, a quantization error in exposing control is increased so that exposure dispersion is increased. To increase the number of steps, it is necessary to increase the number of rotations of the step motor. However, torque of the step motor is decreased as the rotational speed of the step motor is increased. Accordingly, there are many restrictions with respect to the design of mechanical portions in the camera.

Further, in a program shutter described in Japanese Patent Application Laying Open (KOKAI) No. 61-47935, a diaphragm value is necessarily determined when a shutter time suitable for photographing a picture image on the television screen is selected. Accordingly, the operation of the shutter is controlled in only a state in which film sensitivity information and photometric information are neglected and the exposure amount is constant. Therefore, similar to the above-mentioned camera, there is a case in which it is impossible to photograph the picture image on the television screen at a suitable exposure value.

SUMMARY OF THE INVENTION

It is therefore a first object of the present invention to provide a camera having a television mode in which a shutter speed suitable for photographing a picture image on the television screen is preferentially set without increasing the number of mechanical parts and the picture image on the television screen can be photographed at a suitable exposure value based on calculated results in consideration of photometric information and film sensitivity information, thereby providing a photograph having good quality.

A second object of the present invention is to provide a camera having a television mode for obtaining a small exposure value and a photograph of a picture image on the television screen having good quality with high exposure accuracy.

A third object of the present invention is to provide a camera having a television mode in which film sensitivity information and photometric information can be considered to set an exposure amount and driving systems of a step motor are changed in accordance with a normal photographing operation and a photographing operation of a picture image on the television screen so that the picture image on the television screen can be photographed at a suitable exposure value based on calculated results with respect to the photometric information in accordance with brightness of the picture image on the television screen while a shutter speed for photographing this picture image is constantly held, thereby preferably photographing the picture image.

The first object of the present invention can be achieved by a camera having a television mode comprising a shuttter unit for opening and closing a plurality of shutter blades used as a shutter and a diapragm by rotating a step motor in normal and reverse directions; photometric means for performing a photometric operation with respect to a photographed object; mode switching means for selectively switching a television mode for photographing a picture image on a television screen and a normal mode for performing a normal photographing operation; a trigger switch for outputting an open signal in synchronization with an operation for opening the shutter blades and outputting a closed signal in synchronization with an operation for closing the shutter blades; and a calculator for calculating an exposure amount by photometric information provided by the photometric means when the normal photographing mode is selected by the mode switching means; the calculator converting the calculated exposure amount to a time from a generating time point of the open signal of the trigger switch to a time point of the reverse rotation of the step motor so as to control a program exposing operation with respect to the shutter unit; the calculator calculating the exposure amount by the photometric information provided by the photometric means when the television mode is selected; the calculator converting the calculated exposure amount to the number of driving steps from the generating time point of the open signal of the trigger switch to stoppage of the rotation of the step motor; and the calculator setting the time from the generating time point of the open signal to the time point of the reverse rotation of the step motor to a time suitable for photographing the picuture image on the television screen so as to open and close the shuttter by the shuttter unit.

To achieve the second object of the present invention, the calculator sets a reverse rotation time corresponding to the number of driving steps from the generating time point of the open signal of the trigger switch to a start time point of the reverse rotation of the step motor when the television mode is set.

The third object of the present invention can be achieved by a camera having a television mode comprising a shutter unit for opening and closing a plurality of shutter blades used as a shutter and a diaphragm by rotating a step motor in normal and reverse directions; photometric means for performing a photometric operation with respect to a photographed object; mode switching means for selectively switching a television mode for photographing a picture image on a television screen and a normal mode for performing a normal photographing operation by an external operation of the camera; a trigger switch for outputting an open signal in synchronization with an operation for opening the shutter blades and outputting a closed signal in synchronization with an operation for closing the shutter blades; and means for calculating an exposure amount by photometric information provided by the photometric means when the normal photographing mode is selected by the mode switching means; the calculating means converting the calculated exposure amount to a time in accordance with the exposure amount from a generating time point of the open signal of the trigger switch to a time point of the reverse rotation of the step motor so as to control an exposing operation with respect to the shutter unit; the calculating means calculating the exposure amount by the photometric information provided by the photometric means when the television mode is selected; the calculating means converting the calculated exposure amount to the number of motor steps counted from the generating time point of the open signal of the trigger switch, the calculating means further converting the calculated exposure amount to a time from the generating time point of the open signal to the time point of the reverse rotation of the step motor; and the calculating means controlling the exposing operation with respect to the shutter unit by changing an exciting state of the step motor so as to reduce a step angle of the step motor.

In the above-mentioned camera having a television mode, the mode switching means is switched to the normal photographing mode when a normal photographed object is photographed. Thus, the photometric operation with respect to the photographed object is performed by the photometric means. An exposure amount based on photometric information is calculated by the calculator. This exposure amount is converted to a time from the generating time point of an opening signal of the trigger switch to a time point of the reverse rotation of the step motor. Thus, a program exposing operation with respect to the shutter unit is controlled to open and close the shutter.

The mode switching means is set to the television mode when a picture image on the television screen as the photographed object is photographed. Thus, the photometric operation with respect to the picture image on the television screen is performed by the photometric means. An exposure amount is calculated by the calculator using photometric information. This exposure amount is converted to the number of steps counted from the generating time point of the open signal of the trigger switch to stoppage of the rotation of the step motor. Further, the time from this generating time point of the open signal to the reverse rotation of the step motor is set to a time suitable for photographing the picture image on the television screen. Thus, the operation of the shutter unit is controlled to open and close the shutter. Namely, the picture image on the television screen is photographed at a suitable exposure value by preferentially setting a shutter speed suitable for photographing this picture image to control the operation of a diaphragm.

Further, when the mode switching means is switched to the normal mode, the operation of the above-mentioned camera is similar to that at the above normal photographing time. When the mode switching means is switched to the television mode, the calculator sets a time corresponding to the number of steps of the step motor from the generating time point of the open signal of the trigger switch to a start time point of the reverse rotation of the step motor. The shutter unit is opened and closed for this set time so that the picture image on the television screen is photographed at a suitable exposure value.

In the above-mentioned camera having a television mode, the mode switching means is switched to the normal photographing mode at the normal photographing time. Thus, the photometric operation with respect to the photographed object is performed by the photometric means. An exposure amount is calculated by the calculating means using photometric information. The calculating means converts the calculated exposure amount to a time in accordance with the exposure amount from an output time point of the open signal from the trigger switch to a time point of the reverse rotation of the step motor. Thus, a program exposing operation with respect to the shutter unit is automatically controlled to open and close the shutter.

When the picture image on the television screen is photographed, the mode switching means is switched to the television mode for photographing this picture image. Thus, the shutter speed is fixedly set to a constant speed for photographing the picture image on the television screen. A driving step angle of the step motor is reduced by changing an exciting state thereof. Thus, only a diaphragm is slightly changed in accordance with the exposure amount so that a fine exposing operation is performed by diaphragm control in which the shutter speed is preferentially set.

Further objects and advantages of the present invention will be apparent from the following description of the preferred embodiments of the present invention as illustrated in the accompanying drawings.

BRIEF DESCRIPTION OF THE DRAWINGS

FIG. 1a is a view showing the shape of an aperture in a general camera when a normal photographing mode is set;

FIG. 2a is a view showing the shape of an aperture when a photographing mode is set with respect to a picture image on the television screen by the same driving system as that in a normal photographing mode in a camera constituting a base of the present invention;

FIG. 2b and FIG. 2c are timing charts of constructional portions in the camera shown by in FIG. 2a;

DESCRIPTION OF THE PREFERRED EMBODIMENTS

The preferred embodiments of a camera having a television mode in the present invention will next be described in detail with reference to the accompanying drawings.

Figure 1B:
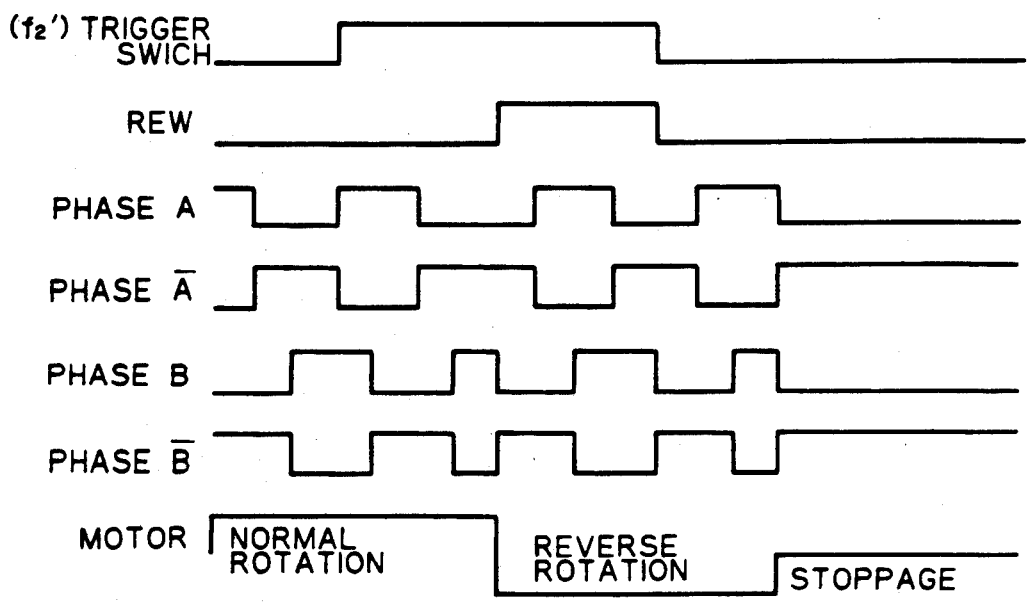
FIG. 1b and FIG. 1c are timing charts of constructional portions in the general camera.
Figure 1C:
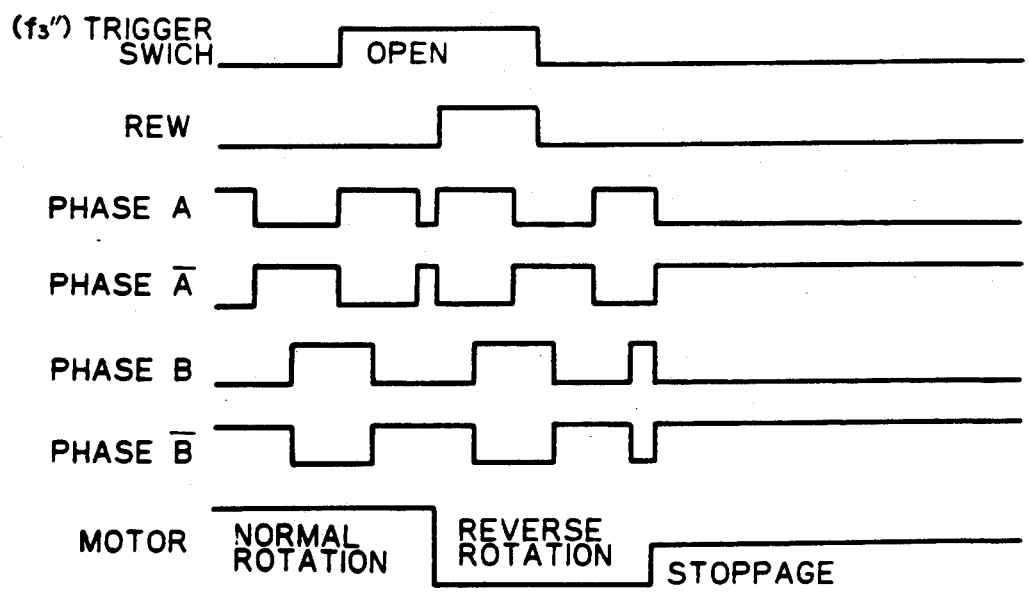

In a general camera, a shutter has a plurality of diaphragm blades and also functions as a diaphragm. As shown in FIG. 1a, FIG. 1b and FIG. 1c the shutter is operated by a step motor and the step motor is driven every step unit to control opening and closing operations of the shutter, thereby performing a normal photographing operation.

FIG. 1a is a view showing the shape of an aperture of diaphragm F with respect to time t in such a camera. FIG. 1b, and FIG. 1c show timing charts of constructional portions of the camera corresponding to FIG. 1a.

FIG. 1b show operating states of the constructional portions of the camera in the case of diaphragm $f_2''$. As shown by items phase A to phase $\overline{B}$ in FIG. 1, a pulse is inputted to the step motor such that windings of phases A, B, $\overline{A}$ and $\overline{B}$ in the step motor are sequentially excited by two-phase excitation to rotate the step motor in a normal direction. Thus, the step motor is driven every step. As shown by FIG. 1a, the winding of phase A is excited at time point $t_{00}$. Then, as shown by item trigger switch in FIG. 1, two shutter blades forming a sector begin to be opened so that a trigger switch is turned on.

Subsequently, time passes in an order of time points $t_{01}$ to $t_{03}$ every time when the windings of phases B, $\overline{A}$ and $\overline{B}$ in the step motor are respectively excited. Thus, the step motor is sequentially driven every step to increase an aperture area of the two shutter blades. The aperture of the two shutter blades is provided as shown by diaphragm $f_2''$ at time point $t_{05}$ in an exciting process of the winding of phase B. Then, as shown by item REW in FIG. 1, a reverse rotation signal (REW) is outputted to the step motor so that the step motor is rotated in a reverse direction. The rotation of the step motor is stopped after the shutter has been completely closed. Thus, as shown by item MOTOR in FIG. 1, the step motor is rotated in the normal and reverse directions and the rotation of the step motor is stopped.

FIG. 1c shows timing charts in the case of diaphragm $f_3''$. The brightness of a photographed object is brighter than that in the case of the above diaphragm $f_2''$ and the aperture area of the shutter (diaphragm) is reduced.

In the case of FIG. 1c, the windings of the respective phases in the step motor are excited in the above-mentioned order. As shown by items phase A to phase $\overline{B}$ in FIG. 1c, the step motor is rotated in the normal direction in the case of phases A, B, $\overline{A}$ and $\overline{B}$. The shutter blades are opened at time point $t_{00}$ and the trigger switch is simultaneously turned on as shown by item REW in FIG. 1.

The diaphragm is $f_3''$ between time points $t_{03}$ and $t_{04}$ in a process in which the two shutter blades are opened. The reverse rotation signal (REW) is outputted to the step motor while the step motor is driven by the excitation of the winding of phase $\overline{B}$. Thus, as shown by item MOTOR in FIG. 1, the step motor is rotated in the reverse direction to close the shutter blades. Then, the step motor is rotated by a predetermined amount in the reverse direction and the rotation of the step motor is stopped. Thus, an exposure amount corresponding to diaphragm $f_3''$ is obtained.

As shown by FIG. 1a, diaphragm $f_1''$ corresponds to a case in which the diaphragm is largest and the photographed object is darkest. Diaphragm $f_4''$ corresponds to a case in which the diaphragm is smallest and the photographed object is brightest. The relation between exposure amount EV and exposure times $t_1''$ to $t_4''$ from diaphragm $f_1''$ to diaphragm $f_4''$ is provided as follows.

$$t_1'' = t_{13} - t_{04}$$
$$t_2'' = t_{12} - t_{03}$$
$$t_3'' = t_{11} - t_{02}$$
$$t_4'' = t_{10} - t_{01}$$
$$t_1'' > t_2'' > t_3'' > t_4'' \quad (1)$$
$$f_1'' > f_2'' > f_3'' > f_4'' \quad (2)$$
$$Evn'' = (tn''/2) \times fn'' \quad (3)$$

From the above inequalities (1) and (2), the following inequality can be obtained.

$$Ev1'' > Ev2'' > Ev3'' > Ev4''$$

Accordingly, the trigger switch is turned on and the shutter blades begin to be opened. Then, an unillustrated central processing unit begins to perform a counting operation and rotates the step motor in the reverse direction on the basis of AE information, thereby providing exposure amount $Ev''$.

Figure 2B:
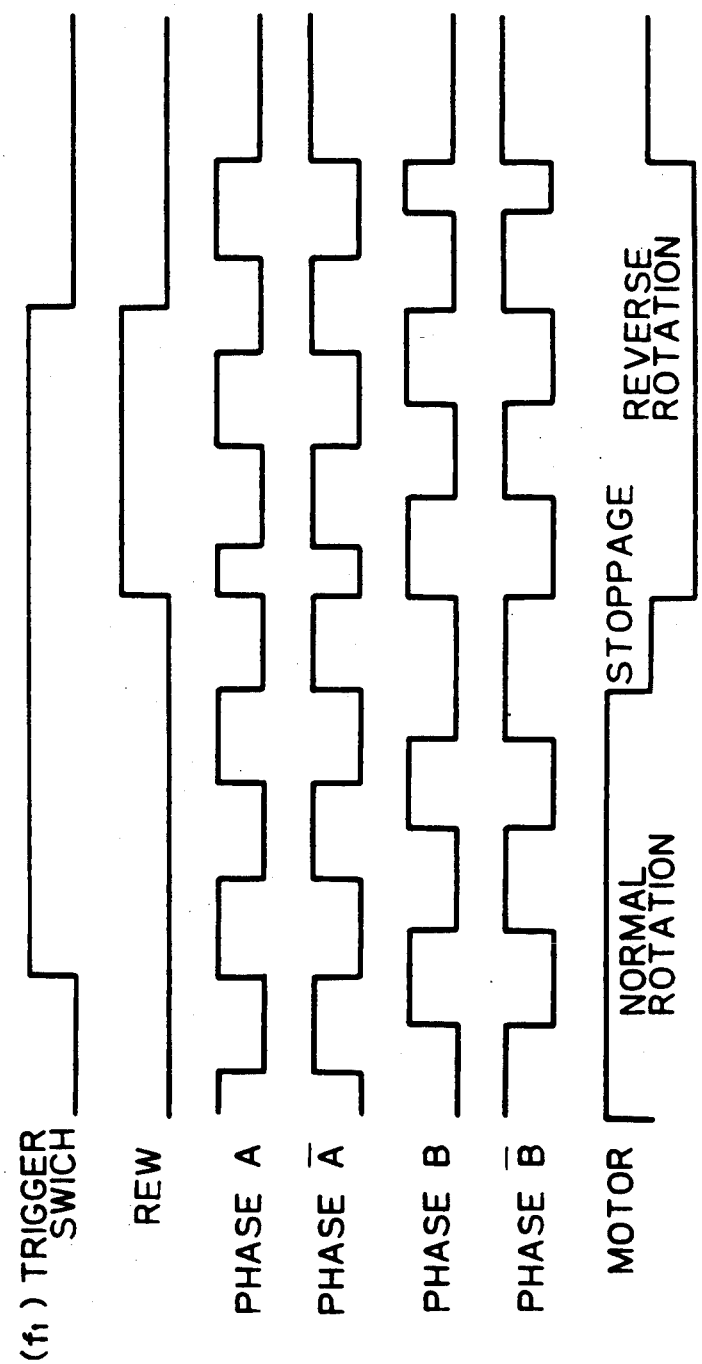

FIG. 2a is a view showing the shape of an aperture of diaphragm F with respect to time t when a television mode is executed by the same driving system as that in a normal photographing mode. In this case, the aperture of the diaphragm is completely opened through three steps of diaphragms $f_3$ to $f_1$ after a trigger switch is turned on as shown by item trigger switch in FIG. 2b. The exposure amount EV is changed at three stages when a picture image on the television screen is photographed.

Items trigger switch to motor in FIG. 2b show a case in which the diaphragm is $f_1$ and the aperture thereof is completely opened. Similar to the case of FIG. 1, windings of phases A, B, $\overline{A}$ and $\overline{B}$ in the step motor are sequentially excited by two-phase excitation as shown by items phase A to phase $\overline{B}$ in FIG. 2b.

As shown by item phase A in FIG. 2b, shutter blades begin to be opened at time point $t_{04}$ at which the winding of phase A is excited. Simultaneously, as shown by item trigger switch in FIG. 2b, the trigger switch is turned on and the diaphragm is opened and set from $f_3$ to $f_2$ in accordance with time points $t_{03}$ to $t_{02}$. The diaphragm is changed from $f_2$ to $f_1$ at time point $t_{15}$ in an exciting process of phase $\overline{B}$ shown by item phase $\overline{B}$ in FIG. 2b. At this time, as shown by item motor in FIG. 2b, the rotation of the step motor is stopped and the aperture of the open diaphragm $f_1$ is maintained at a time interval between $t_{14}$ and $t_{15}$ corresponding to diaphragm $f_1$. As shown by items REW and motor in FIG. 2b, the step motor is rotated in the reverse direction and the shutter is closed at time point $t_{14}$.

Figure 2C:
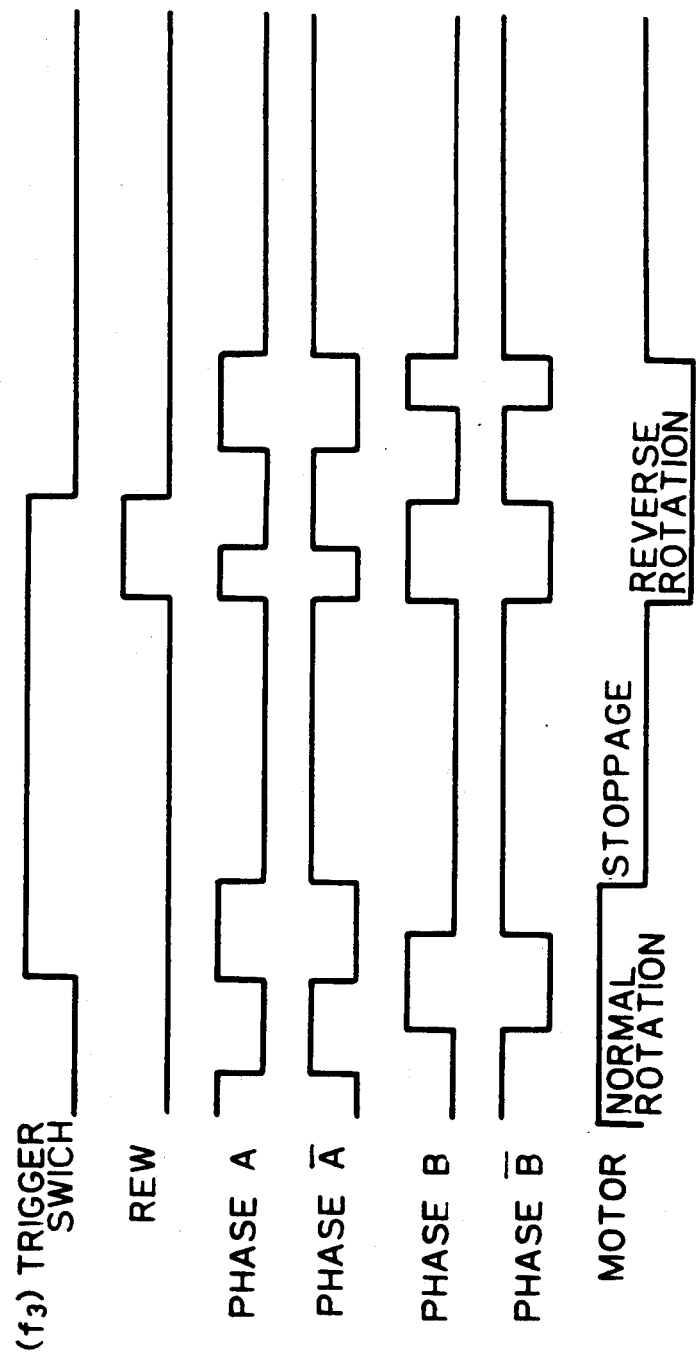

When the diaphragm is $f_3$ and the aperture thereof is smallest as shown by items trigger switch to motor in FIG. 2c, the shutter blades begin to be opened at time point $t_{04}$ in an exciting process of phase A. The trigger switch is turned on at this time point $t_{04}$ as shown by item trigger switch in FIG. 2c.

Subsequently, the windings of phase B, $\overline{A}$, — in the step motor are sequentially excited in accordance with time points $t_{03}$ to $t_{02}$. As shown by item motor in FIG. 2c, the rotation of the step motor is stopped and the aperture of diaphragm $f_3$ is maintained simultaneously when the winding of phase $\overline{A}$ is excited.

Next, as shown by item motor in FIG. 2c, the windings are excited in a phase order opposite to the above-mentioned phase order and the step motor is rotated in the reverse direction at time point $t_{14}$. Thus, the shutter is closed and the trigger switch is turned off as shown by item trigger switch in FIG. 2c.

In FIG. 2a, photographing time $t_{TV}$ with respect to a picture image on the television screen is provided as follows.

$$t_{TV} = t_{11} - t_{01} = t_{12} - t_{02} = t_{13} - t_{03}$$

The diaphragms $f_1$, $f_2$ and $f_3$ satisfy the following condition.

$$f_1 > f_2 > f_3$$

The exposure amount Ev is provided as follows.

$$Evn = (fn/2) \times t_{TV}$$

Accordingly, the following condition is obtained.

$$Ev1 > Ev2 > Ev3 \quad (a)$$

As can be seen from FIG. 2a, in FIG. 2b, FIG. 2c, the exposure amount Ev can be changed at only three stages of diaphragms $f_3$, $f_2$ and $f_1$ at a photographing time of the picture image on the television screen.

Japanese Patent Application Laying Open (KOKAI) No. 61-47935 shows a program shutter. In this program shutter, a phase of a driving pulse is compulsorily inverted after a time inversely proportional to the brightness of a photographed object has passed from an opening time of the shutter. Thus, the rotary directions of a step motor are compulsorily switched to control an exposure amount at real time.

Figure 3:
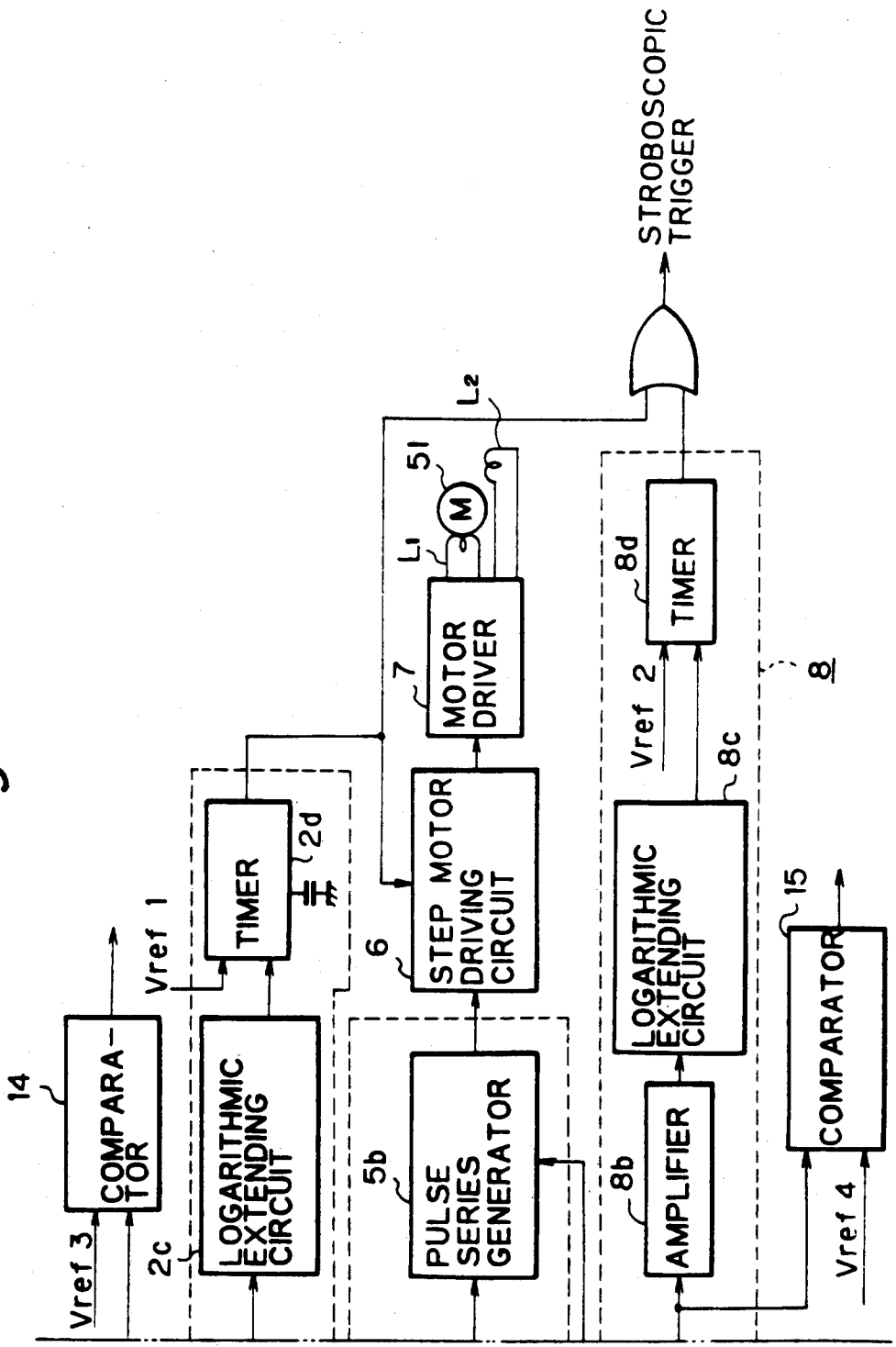
FIG. 3i and 3ii together are a block diagram of a controller for controlling the operation of a general program shutter mechanism.

FIG. 3 is a block diagram of this program shutter. The operation of the program shutter in FIG. 3 will next be described.

In FIG. 3, an unillustrated power switch is turned on and release button is pushed until a first stage pushing-down position. Thus, a photometric switch 11 is turned on and a circuit 1 for measuring the brightness of a photographed object is operated. An electric signal proportional to the brightness of the photographed object detected by a light-receiving element 1a of the brightness measuring circuit 1 is logarithmically compressed. A brightness signal is outputted to a differential amplifier 2a of a circuit 2 for controlling an exposure amount.

The differential amplifier 2a also receives a signal apex-converted by an analog/digital converter 4 with respect to information from a film sensitivity detecting section of a cartridge, a manual switch 3, etc.

Accordingly, the differential amplifier 2a sets the apex-converted signal as a reference signal and calculates the difference in voltage between this reference signal and the brightness signal. The results of the voltage difference are outputted from the differential amplifier 2a to a logarithmic extending circuit 2c through an amplifier 2b and are also outputted to a comparator 14.

The comparator 14 compares an output voltage of the differential amplifier 2a with a set voltage value $V_{ref3}$. When the output voltage of the differential amplifier 2a is less than the set voltage value $V_{ref3}$, a warning is given since there is a fear that the camera is manually vibrated by insufficiency of brightness.

When there is no warning with respect to low brightness, the release button is pushed until a second stage thereof so that a release switch 12 is turned on. Thus, the output signal of the differential amplifier 2a amplified by the amplifier 2b is converted to a linear function by the logarithmic extending circuit 2c and is inputted to a timer 2d. Simultaneously, a sector open signal is outputted from a timing control circuit 10 to a pulse series generator 5b in a circuit 5 for generating a pulse for driving the step motor.

Thus, the pulse generating circuit 5 begins to be operated and outputs a series of pulses for rotating a pulse motor 51 in a normal direction to a step motor driving circuit 6 on the basis of a reference clock signal from a reference clock generating circuit 5a. An output of the step motor driving circuit 6 is transmitted to a motor driver 7 so that an exciting electric current is supplied by the motor driver 7 to first and second exciting coils L1 and L2. Thus, the pulse motor 51 is rotated in the normal direction to open the sector.

While the pulse motor 51 is continuously rotated in the normal direction and the sector is opened, an apex operation with respect to film sensitivity and the brightness of the photographed object is performed by the differential amplifier 2a in the exposure amount control circuit 2. When a time corresponding to the difference between film sensitivity and the brightness of the photographed object has passed, a reverse rotation signal is outputted from the timer 2d to the step motor driving circuit 6. Thus, the step motor is rotated in the reverse direction and moving directions of the pulses are switched. The step motor 51 is compulsorily rotated by the step motor driver 7 in the reverse direction irrespective of the movement of the step motor 51 between steps. Thus, the sector is rotated in a reverse direction to close an optical path in the camera so that an exposing operation optimum to the brightness of the photographed object is completed.

When the brightness of the photographed object is insufficient and a warning with respect to low brightness is given by comparing the output voltage of the differential amplifier 2a with the set value $V_{ref3}$ by the comparator 14, an unillustrated flash mode switch is operated to select a flash mode. The release button is pushed until the second stage thereof and the sector open signal is outputted from the timing control circuit 10 to the pulse series generator 5b in the step motor pulse generating circuit 5.

Thus, as mentioned above, a pulse indicative of the normal rotation of the step motor 51 is outputted from the pulse series generator 5b to the step motor driving circuit 6. The step motor 51 is then rotated by the motor driver 7 in the normal direction to open the sector.

Simultaneously, at least one of a stroboscopic turning-on signal and a low brightness signal is transmitted to a differential amplifier 8a of a stroboscopic trigger generating circuit 8. The differential amplifier 8a calculates the difference in voltage between an apex-converted signal of film sensitivity data from the A/D converter 4 and a signal of apex-converted data from a detector 9 for detecting the distance of the photographed object. This voltage difference is amplified by an amplifier 8b and is outputted to a logarithmic extending circuit 8c.

The logarithmic extending circuit 8c converts an output of the amplifier 8b to a linear signal and transmits this signal to a timer 8d.

This output signal of the logarithmic extending circuit 8c is compared with a reference signal $V_{ref2}$ by using the timer 8d. After a time corresponding to the difference in voltage between the output signal of the logarithmic extending circuit 8c and the reference signal $V_{ref2}$ has passed, a stroboscopic trigger is outputted from the timer 8d to operate a stroboscope, thereby emitting light therefrom.

The level in voltage of a signal from the photographed object brightness measuring circuit 1 is rapidly increased by receiving the stroboscopic light. Therefore, the timer 2d of the exposure amount control circuit 2 outputs a signal so that a pulse transmitted from the step motor driving circuit 6 to the motor driver 7 is compulsorily inverted, thereby closing the sector.

A self-timer circuit 13a starts a time counting operation by the operation of a self-timer switch 13 and outputs a start signal after a predetermined time. A comparator 15 compares an output voltage of the differential amplifier 8a with a set value $V_{ref4}$. When the output voltage of the differential amplifier 8a is less than the set value $V_{ref4}$, the comparator 15 gives a warning that no photographing operation can be performed by using the stroboscope.

In the camera having a function for switching the normal mode to the photographing mode of a picture image on the television screen, only the shutter speed is set to a value suitable for photographing the picture image on the television screen when the television mode for photographing this picture image is set. However, an exposure value is constant irrespective of ISO information of a film and photometric information. Accordingly, the exposure value does not correspond to the brightness of the picture image on the television screen. Therefore, there is a case in which the picture image is photographed by excessive and insufficient exposure amounts.

Further, in the control circuit of a program shutter proposed in Japanese Patent Application Laying Open (KOKAI) No. 60-254027, only a proportional relation between the diaphragm and the shutter can be controlled. Accordingly, when the picture image on the television screen is photographed, the operation of the shutter is controlled in only a state in which the ISO information and the photometric information are neglected and the exposure amount is constant. Therefore, similar to the above-mentioned camera, there is a case in which the picture image on the television screen cannot be photographed at a suitable exposure amount.

In a camera using the above focal plane shutter, the operations of the shutter and the diaphragm must be independently controlled and the structure of the camera is complicated, thereby increasing the cost of the camera.

In the case of a shutter having a plurality of diaphragm blades and having shutter and diaphragm functions, the shutter is completely opened in three steps after a trigger switch is turned on. When the number of steps from the beginning of an opening operation of the shutter to a completely opening state thereof at the normal photographing time is not set to be large at a designing time of the camera, a quantization error in exposing control is increased so that exposure dispersion is increased. To increase the number of steps, it is necessary to increase the number of rotations of the step motor. However, torque of the step motor is decreased as the rotational speed of the step motor is increased. Accordingly, there are many restrictions with respect to the design of mechanical portions in the camera.

In the above program shutter described in Japanese Patent Application Laying Open (KOKAI) No. 61-47935, a diaphragm value is necessarily determined when a shutter time suitable for photographing the picture image on the television screen is selected. Accordingly, the operation of the shutter is controlled in only a state in which film sensitivity information and photometric information are neglected and the exposure amount EV is constant. Therefore, similar to the above-mentioned camera, there is a case in which it is impossible to photograph the picture image on the television screen at a suitable exposure value.

Figure 4:
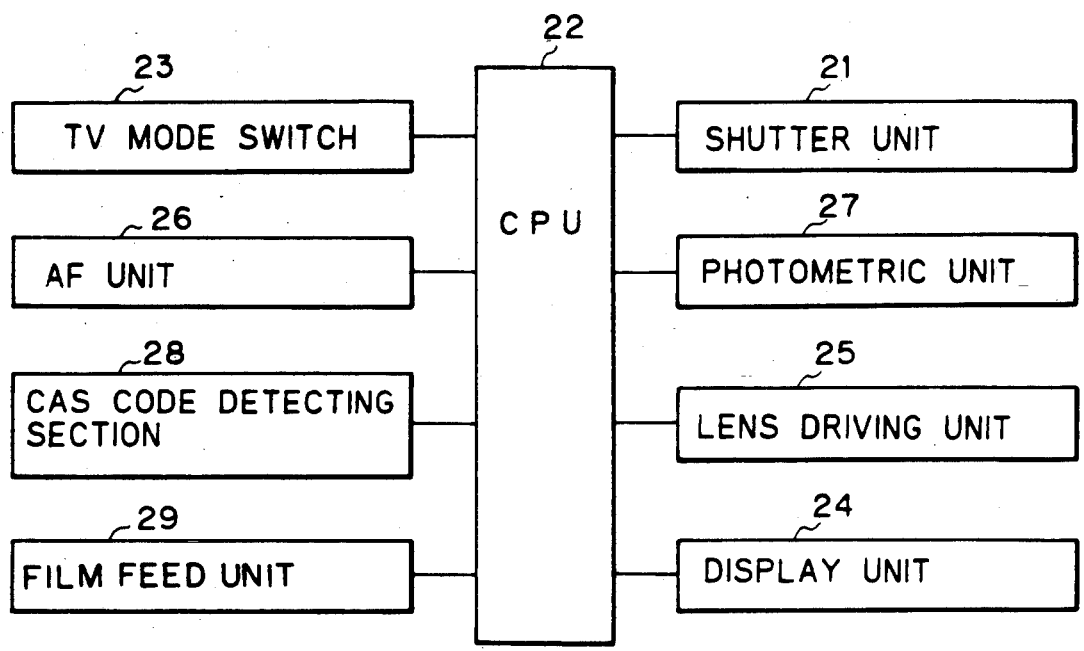
FIG. 4 is a block diagram showing the construction of a camera having a television mode in a first embodiment of the present invention.

FIG. 4 is a block diagram showing the entire construction of a camera having a television mode in a first embodiment of the present invention.

In FIG. 4, reference numeral 21 designates a shutter unit and a release button is arranged in a predetermined position such as an upper face of an unillustrated camera body, etc. When the release button is pushed until a first stage thereof and is in a half pushing state, a first release switch is turned on so that a distance measuring operation and a photometric operation are started. When the release button is pushed until a second stage thereof and is in a complete pushing state, a second release switch is turned on so that a shutter described later is opened.

Outputs of the first and second release switches in accordance with turning-on and turning-off states thereof are respectively outputted to a central processing unit (which is called CPU in the following description) 22 as a calculator. The central processing unit 22 is built in the above camera.

A television mode switch 23 as a mode switching means is connected to the central processing unit 22. The television mode switch 23 is a switch for switching television and normal modes in accordance with a photographing time of a picture image on the television screen and a normal photographing time of a photographed object.

Signals according to the television and normal modes set by the television mode switch 23 are inputted to the central processing unit 22.

For example, when the television mode switch 23 is set to the television mode, a shutter speed in the shutter unit 21 is set by the central processing unit 22 to e.g., 1/30 second so as to suitably photograph the picture image on the television screen. This shutter speed is displayed in a display unit 24. This display unit 24 is arranged in a position such as an upper face of the above camera in which it is easy for a photographer to see the displayed shutter speed.

The first release switch is turned on by pushing the above release button until the first stage thereof. Simultaneously, the central processing unit 22 gives a command to an automatic focus unit 26 to start the distance measuring operation. In the distance measuring operation, the distance between the photographed object and a film exposure face is measured. Distance measuring information of this automatic focus unit 26 is also inputted to the central processing unit 22.

A photometric unit 27 starts a photometric operation with respect to the photographed object by the command of the central processing unit 22 in parallel with the distance measuring operation of the automatic focus unit 26. Photometric information is transmitted from the photometric unit 27 to the central processing unit 22.

A CAS code detecting section 28 reads ISO information, etc. displayed on e.g., a film surface and inputs film sensitivity information, etc. to the central processing unit 22.

The operation of a film feed unit 29 is controlled by the operation of the central processing unit 22 such that one film frame is automatically fed and rewound. In this feed unit 29, the second release switch is turned on by pushing the release button until the second stage thereof so that the shutter is opened and closed. An unillustrated feed motor is driven approximately simultaneously when the film is completely exposed. Thus, one film frame is fed and the film is wound to prepare a photographing operation for the next one film frame.

Figure 5:
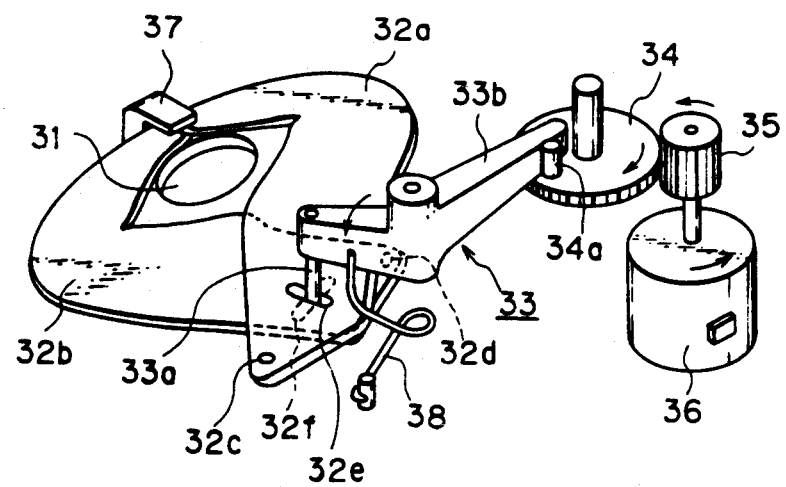
FIG. 5 is a perspective view showing the construction of a shutter mechanism applied to the camera in the first embodiment of the present invention.

FIG. 5 is a perspective view showing the construction of a shutter mechanism in the shutter unit 21.

In FIG. 5, an aperture portion 31 is located on the same axis as the optical axis of a photographing lens. Light reflected from the photographed object through the photographing lens is guided by the aperture portion 31 onto an exposure face of the film.

An aperture area of this aperture portion 31 is changed in accordance with an opening degree of shutter blades 32a and 32b which are also used as two diaphragms constituting sectors. Basic portions of the two shutter blades 32a and 32b are pivotally supported by fulcrum portions 32c and 32d. The aperture area of the aperture portion 31 is changed by rotating the shutter blades around the fulcrum portions 32c and 32d.

Elongated holes 32e, 32f for rotating the two shutter blades 32a, 32b are formed in the vicinity of inner sides of the fulcrum portions 32c, 32d of the shutter blades 32a, 32b. A driving pin 33a of a lever 33 is inserted into the elongated holes 32e and 32f.

The lever 33 is formed in the shape of a bell crank and the driving pin 33a is projected from a lower face of one shorter arm of the lever 33. A handle portion 33b is constructed by the other longer arm of the lever 33. A pin 34a of a driving gear 34 is engaged with a side face of the handle portion 33b at an end thereof. The pin 34a is disposed on the driving gear 34 in a position separated from a center thereof. The driving gear 34 is rotated by a step motor 36.

An unillustrated pulse generator generates a clock pulse by the operation of the central processing unit 22. This clock pulse is controlled by a control circuit within the central processing unit 22 so that a normal or reverse rotation pulse is generated. This normal or reverse rotation pulse is transmitted to the step motor 36 through an unillustrated driving circuit. Thus, the step motor 36 is rotated in the clockwise direction (the reverse direction) and the counterclockwise direction (the normal direction).

In a step motor 36 in a second embodiment described later, an unillustrated pulse generator generates a clock pulse by the operation of the central processing unit 22. This clock pulse is controlled by the control circuit within the central processing unit 22. In particular, two exciting systems of two-phase excitation and one-phase/two-phase excitation are switched to generate a normal or reverse rotation pulse in accordance with the operation of the television mode switch 23. This normal or reverse rotation pulse is transmitted to the step motor 36 through the unillustrated driving circuit. Thus, the step motor 36 is rotated in the clockwise direction (the reverse direction) and the counterclockwise direction (the normal direction).

An output gear 35 is attached to a rotary shaft of the step motor 36 and is engaged with the above driving gear 34.

Thus, rotary force of the step motor 36 in the counterclockwise direction is transmitted to the driving gear 34 through the output gear 35 so that the driving gear 34 is rotated in the clockwise direction. When the driving gear 34 is rotated by a predetermined angle in the clockwise direction, the pin 34a is engaged with the handle portion 33b of the lever 33 so that the lever 33 is rotated in the counterclockwise direction. Accordingly, the driving pin 33a of the lever 33 moves the elongated holes 32e and 32f downward in FIG. 5. The two shutter blades 32a and 32b are respectively rotated around the fulcrum portions 32c and 32d in the clockwise and counterclockwise directions to increase the aperture area of the aperture portion 31.

In contrast to this, when the step motor 36 is rotated in the clockwise direction, the operations of the camera are opposite to the above-mentioned operations. Namely, the two shutter blades 32a and 32b are respectively rotated around the fulcrum portions 32c and 32d to close the aperture portion 31.

For example, a trigger switch 37 detects photoelectrically or mechanically that the aperture portion 31 begins to be opened by the shutter blades 32a and 32b. When the trigger switch 37 detects that the aperture portion 31 begins to be opened by the shutter blades 32a and 32b, the trigger switch 37 outputs a trigger signal at a high voltage level as an open signal. This high voltage level is maintained while the shutter blades 32a and 32b are opened. The trigger switch 37 outputs a trigger signal at a low voltage level as a closed signal simultaneously when the shutter blades 32a and 32b are closed.

A lever return spring 38 is a spring for biasing the lever 33 toward its original position, i.e., in a direction in which the shutter blades 32a and 32b are closed.

Figure 6A:
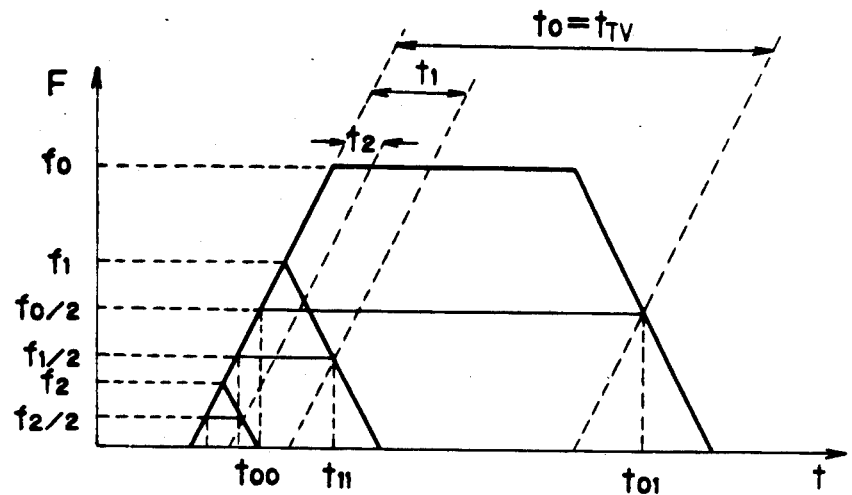
FIG. 6a is a view showing the shape of an aperture when a normal mode is set in the camera in the first embodiment of the present invention.
Figure 6B:
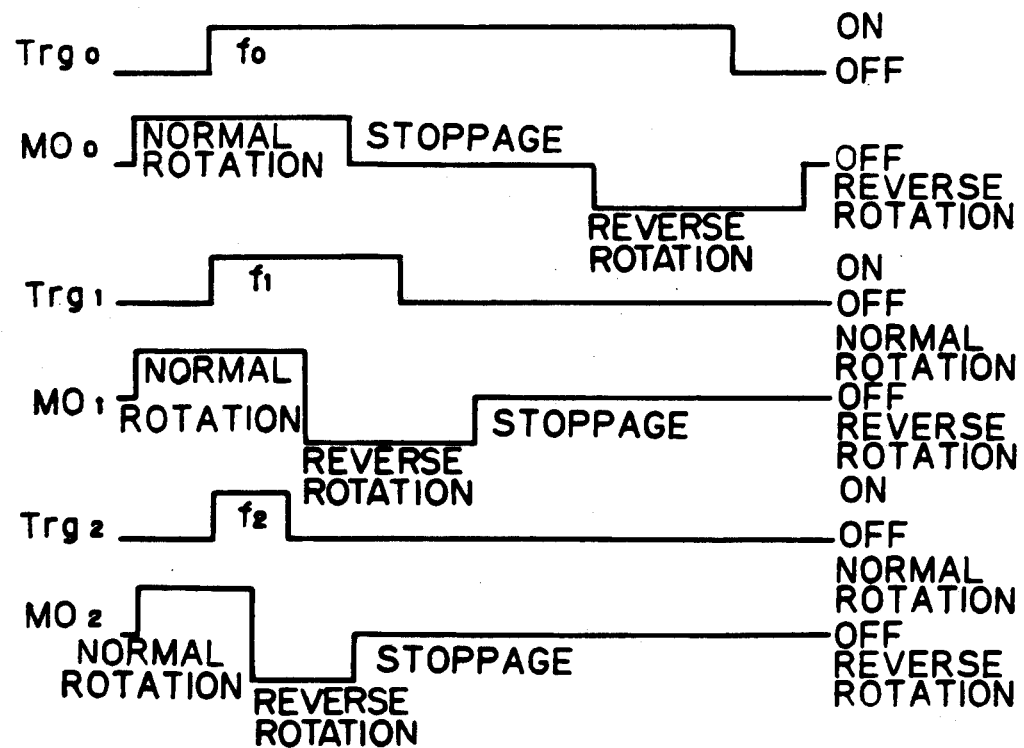
FIG. 6b are timing charts of constructional portions in the camera in the first embodiment of the present invention.
Figure 7:
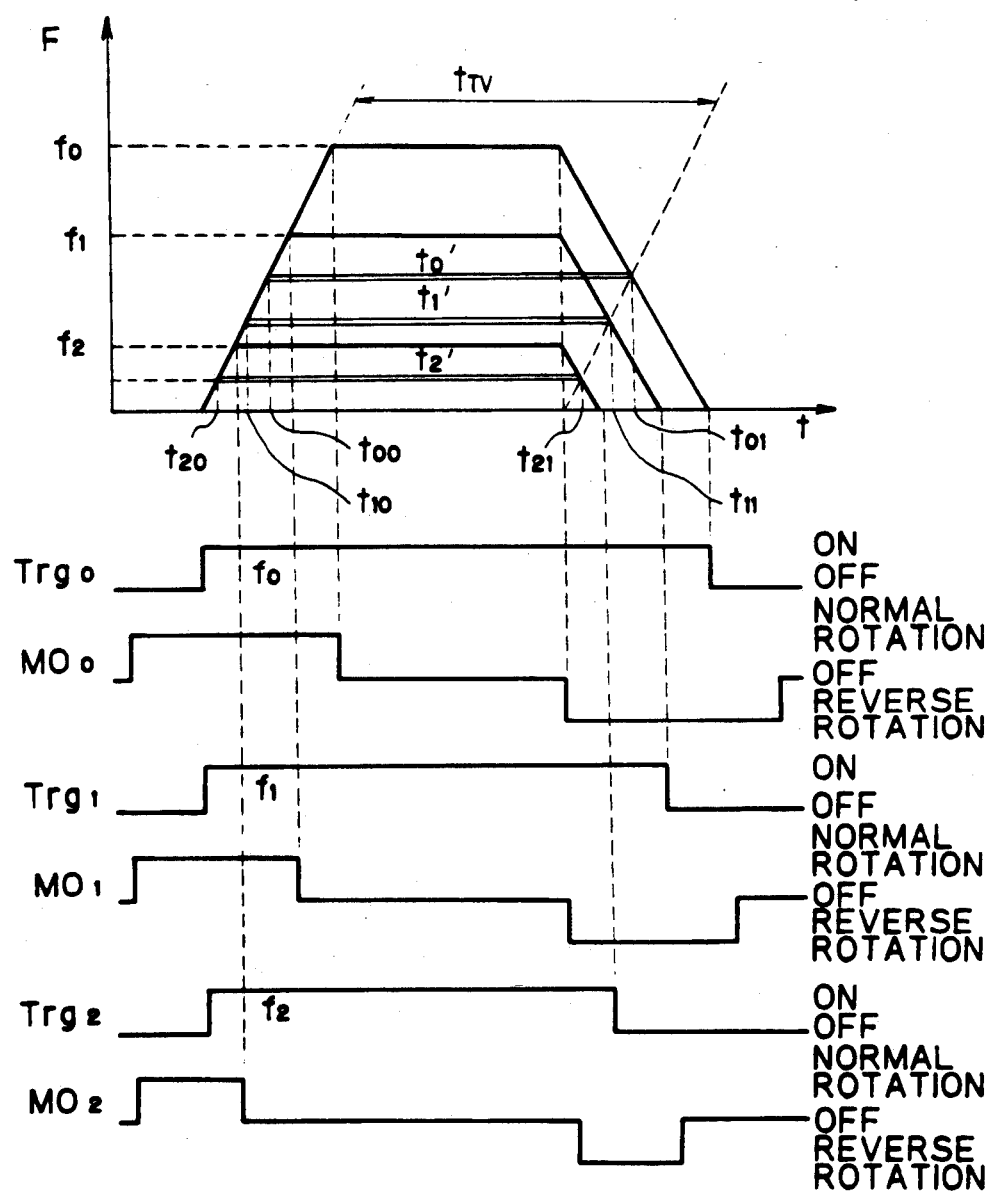
FIG. 7 shows a view showing the shape of an aperture when a television mode is set in the camera in the first embodiment of the present invention and timing charts of the constructional portions in the camera in the first embodiment of the present invention.

The operation of the above-mentioned camera in the first embodiment of the present invention will next be described with reference to FIGS. 6a, 6b and 7 showing the shape of the aperture and timing charts of constructional portions in this camera.

FIG. 6a shows the shape of the aperture at a normal photographing time in the normal mode. Items Trgo to $MO_2$ in FIG. 6b correspond to FIG. 6a and show timing charts of the constructional portions in the camera at the normal photographing time in the normal mode.

Item (a) in FIG. 7 shows the shape of the aperture in the television mode when a picture image on the television screen is photographed. Items Trgo to $MO_2$ in FIG. 7 correspond to the view showing the shape of the aperture in FIG. 7 and show timing charts of the constructional portions in the camera in the television mode when the picture image on the television screen is photographed.

In the case of the normal mode, the television mode switch 23 is switched to the normal mode so that the normal mode is set. The release button is pushed until the first stage thereof and is in the half pushing state while a lens in the camera is directed toward a photographed object and a photographer looks into a finder of the camera. In this case, the first release switch is turned on so that the central processing unit 22 gives a command about the distance measuring operation to the automatic focus unit 26. After the distance measuring operation is performed, automatic focus information from the automatic focus unit 26 is inputted to the central processing unit 22 so that the central processing unit 22 drives a lens driving unit 25 to focus a lens system.

Further, photometric information is inputted from the photometric unit 27 to the central processing unit 22. The central processing unit 22 calculates an exposure amount based on the photometric information. In this state, when the release button is pushed until the second stage thereof and is in the complete pushing state, the second release switch is turned on.

The diaphragm is assumed to be $f_0$ shown by FIG. 6a on the basis of the results of the exposure amount calculated by the central processing unit 22. In this case, program control with respect to shutter speed $t_0$ with respect to diaphragm $f_0$ is performed.

Namely, the control circuit controls the operation of the pulse generator based on the command of the central processing unit 22. Thus, a normal rotation pulse is generated from the pulse generator and is transmitted to the step motor 36 through a driving circuit. Thus, the step motor 36 is rotated in the normal direction as shown by item $MO_0$ in FIG. 6b.

The step motor 36 is thus rotated in the counterclockwise direction and its rotary force is transmitted to the driving gear 34 through the output gear 35. The driving gear 34 is rotated in the clockwise direction and the pin 34a is engaged with a side face of the handle portion 33b of the lever 33.

Thus, the lever 33 is rotated in the counterclockwise direction and the driving pin 33a moves the elongated holes 32e and 32f of the shutter blades 32a and 32b downward in FIG. 5. As a result, the shutter blades 32a and 32b are respectively rotated around the fulcrum portions 32c and 32d in the clockwise and counterclockwise directions so that the aperture portion 31 begins to be opened.

Namely, the aperture portion 31 begins to be opened after a predetermined time has passed since the rotation of the step motor 36.

As shown by item Trgo in FIG. 6b, the trigger switch 37 is turned on simultaneously when the two shutter blades 32a and 32b begin to be opened, thereby outputting an open signal at a high voltage level. While the trigger switch 37 is turned on and the shutter is therefore opened, the central processing unit 22 starts a time counting operation from a time point at which the shutter blades 32a and 32b begin to be opened and the open signal is generated.

This counting operation is performed until the shutter blades 32a and 32b begin to be closed in accordance with the calculated results of the exposure value based on the above photometric information. This counting operation is stopped at a time point at which the step motor 36 begins to be rotated in the reverse direction as shown by FIG. 6a and $MO_0$ in FIG. 6b. As shown by item $MO_0$ in FIG. 6b, the central processing unit 22 rotates the step motor 36 in the reverse direction at a shutter time corresponding to a program exposure value automatically calculated on the basis of the above photometric information. Thus, the step motor 36 moves the shutter blades 32a and 32b in a direction in which these shutter blades are closed.

The driving gear 34 is also rotated by the reverse rotation of the step motor 36 in a direction opposite to the above-mentioned direction. The driving pin 33a of the lever 33 moves the elongated holes 32e and 32f upward. The shutter blades 32a and 32b are rotated around the fulcrum portions 32c and 32d in a direction in which the aperture portion 31 is closed. The central processing unit 22 stops the reverse rotation of the step motor 36 in a short time after the shutter blades 32a and 32b are completely closed.

Items $Trg_1$ and $MO_1$ in FIG. 6b show a case in which the brightness of the photographed object is greater than that in the above case and the shutter time with respect to an effective exposure time for the program automatic exposure corresponding to diaphragm $f_1$ is set to $t_1$. Items $Trg_2$ and $MO_2$ in FIG. 6b show a case in which the brightness of the photographed object is greater than that in the case of items $Trg_1$ and $MO_1$ in FIG. 6b and the shutter time with respect to an effective exposure time for the program automatic exposure corresponding to diaphragm $f_2$ is set to $t_2$. As mentioned above, an exposure amount based on photometric information and film sensitivity information, etc. is converted to a time provided until the step motor 36 is rotated in the reverse direction after the trigger switch 37 is turned on, thereby performing the program automatic exposing operation.

The diaphragm $f_0$ and the shutter speed $t_{01} - t_{00} = t_0$ must be set to select the shutter time (the effective exposure time $t_{TV}$) suitable for photographing the picture image on the television screen in the above normal mode. Accordingly, the exposure amount becomes a fixed amount so that it is impossible to perform a photographing operation corresponding to the changed brightness of the picture image on the television screen.

Therefore, in this embodiment, diaphragm control (aperture control) is performed in a state in which the shutter speed is preferentially set to 1/30 second fixedly in the television mode shown in FIG. 7.

Namely, when the television mode switch 23 as a mode switching means is set to the television mode, the central processing unit 22 outputs a control signal to the shutter unit 21 so that the shutter speed is set to 1/30 second optimum for photographing the picture image on the television screen.

When the release button is next pushed until the first stage thereof, the first release switch is turned on. Thus, as mentioned above, the central processing unit 22 calculates the exposure amount based on the photometric information.

In the case of diaphragm $f_0$ shown by an upper diagram in FIG. 7, the camera is operated as follows in accordance with this calculation of the exposure amount.

As mentioned above, a normal rotation signal is transmitted to the step motor 36 as shown by item $MO_0$ in FIG. 7. Thus, the step motor 36 is rotated in the counterclockwise direction. When the shutter blades 32a and 32b begin to be opened, the trigger switch 27 is turned on so that an open signal at a high voltage level is outputted as shown by item $Trg_0$ in FIG. 7. Simultaneously, the central processing unit 22 begins to count time, i.e., the number of steps of the step motor. When the counting value has reached a value at which the diaphragm of the shutter blades 32a and 32b is $f_0$, the rotation of the step motor 36 is stopped as shown by item $MO_0$ in FIG. 7 and diaphragm $f_0$ is maintained as it is. When the shutter speed has reached a speed capable of photographing the picture image on the television screen at time $t_{TV}$, a driving voltage for rotating the step motor 36 in the reverse direction is applied to the step motor 36 as shown by item $MO_0$ in FIG. 7. Thus, the step motor 36 is rotated in the reverse direction so that the shutter blades 32a and 32b are moved in a direction in which these blades are closed.

Thus, an opening time of the shutter in the case of diaphragm $f_0$ becomes $t_{01} - t_{00} = t_0'$.

The next description relates to a case in which the brightness of the photographed object is greater than that in the above case and the diaphragm is controlled and set to $f_1$ by calculating the above exposure amount by a calculator in the central processing unit 22.

In this case, as shown by item $MO_1$ in FIG. 7, the shutter blades 32a and 32b begin to be opened. The calculator in the central processing unit 22 converts the above exposure amount to the number of steps provided until the shutter blades 32a and 32b provide diaphragm $f_1$ after the trigger switch 37 is turned on as shown by item $Trg_1$ in FIG. 7. Accordingly, as shown by item $MO_1$ in FIG. 7, when the diaphragm becomes $f_1$, the rotation of the step motor 36 is stopped. At the shutter time $t_{TV}$ suitable for photographing a picture image on the television screen, the step motor 36 is rotated in the reverse direction so that the shutter blades 32a and 32b are moved in the closing direction thereof.

Thus, the opening time of the shutter in the case of diaphragm $f_1$ becomes $t_{11} - t_{10} = t_1'$.

Items $Trg_2$ and $MO_2$ in FIG. 7 show a case in which the photographed object is bright and the diaphragm is controlled and set to $f_2$. As shown by a trigger signal shown by item $Trg_2$ in FIG. 7 and item $MO_2$ in FIG. 7, the rotation of the step motor 36 is stopped simultaneously when the diaphragm becomes $f_2$, and the opening of the aperture portion 31 is maintained as it is with diaphragm $f_2$. At the shutter time $t_{TV}$ suitable for photographing a picture image on the television screen, the step motor 36 is rotated in the reverse direction so that the shutter blades 32a and 32b are moved in the closing direction thereof.

The opening time of the shutter in the case of diaphragm $f_2$ is $t_{21} - t_{20} = t_2'$. As can be seen from FIG. 7, the shutter opening times $t_0'$, $t_1'$ and $t_2'$ in the cases of diaphragms $f_0$, $f_1$ and $f_2$ satisfy the following condition.

$$t_0' = t_1' = t_2' = t_{TV}$$

Therefore, it is possible to automatically control the exposure amount by the diaphragm control in which the shutter speed is preferentially set to 1/30 second fixedly.

Accordingly, it is possible to obtain an exposure amount suitable for the changing brightness of the picture image on the television screen and preferably photograph this picture image even when the shutter speed is fixedly set to 1/30 second.

As mentioned above, in accordance with the first embodiment, the exposure amount is calculated in the television mode in accordance with the photometric information of the photometric unit 27. The exposure amount is converted to the number of steps of the step motor 36 provided until a diaphragm value corresponding to this exposure amount after the trigger switch is turned on. The diaphragm control is performed in a state in which a time until the beginning of the reverse rotation of the step motor 36 is constant. Accordingly, it is possible to automatically control the exposing operation using the diaphragm control at a shutter speed optimum for photographing the picture image on the television screen. Further, it is possible to obtain a suitable exposure value based on the photometric information in consideration of ISO information from a CAS code, thereby preferably photographing the picture image on the television screen corresponding to the brightness thereof.

The present invention is not limited to the above embodiment, but can be changed in various kinds of modifications within the scope of the features of the invention.

For example, the calculator can be constructed such that the exposure amount is converted to a time corresponding to the number of steps provided until the step motor 36 is rotated in the reverse direction after the trigger switch 37 is turned on. In such a structure, it is possible to preferably photograph the picture image on the television screen with high exposure accuracy.

The operation of a camera having a television mode in a second embodiment of the present invention will next be described with reference to FIG. 8a, FIG. 8b and FIG. 8c respectively showing the shape of an aperture and timing charts of constructional portions in this camera.

The television mode switch 23 as a mode switching means is turned off at a normal photographing time. Thus, the television mode switch 23 is switched to a normal photographing mode, i.e., a normal mode. In this mode, an unillustrated control circuit is operated by a two-phase exciting system in which an electric current simultaneously flows through windings of two phases in the step motor 36. The operations of constructional portions in the camera in this second embodiment are similar to those in the case of the camera shown by FIG. 1a, FIG. 1b and FIG. 1c.

In this case, an exposure calculating section within the central processing unit 22 calculates an exposure amount based on photometric information from the photometric unit 27. The exposure amount is converted to a time provided in accordance with this exposure amount until the step motor 36 is rotated in the reverse direction after the trigger switch 37 generates an open or trigger signal at a high voltage level. Opening and closing operations of a shutter in the shutter unit 21 are controlled by this conversion. Namely, program AE control with respect to diaphragm and time in accordance with the exposure amount is performed such that no step control of the step motor 36 is changed by driving the step motor 36 by the two-phase exciting system.

The operation of the camera in the second embodiment will next be described when a picture image on the television screen is photographed.

A television mode switch 23 is first switched to a television mode for photographing the picture image on the television screen. In this case, the television mode is displayed by a display unit 24. Simultaneously, a shutter time is set to $t_{TV}$ such as 1/30 second suitable for photographing the picture image on the television screen.

When a control circuit within the central processing unit 22 receives a television mode signal from the television mode switch 23, the control circuit switches the two-phase exciting system to a one-phase/two-phase exciting system with respect to the step motor 36.

In this state, a lens in the camera is directed toward the television screen and a release button is pushed until a first stage thereof while a photographer looks into a finder of the camera. Thus, a first release switch of the shutter unit 21 is turned on so that distance measuring information is inputted from an automatic focus unit 26 to the control circuit within the central processing unit 22. Simultaneously, the control circuit controls the operation of a lens driving unit 25 so as to focus a lens system with respect to a picture image on the television screen.

Simultaneously, photometric information with respect to the picture image on the television screen is inputted from the photometric unit 27 to an exposure calculating circuit of the central processing unit 22.

This exposure calculating circuit controls the diaphragm of the shutter blades 32a and 32b based on the photometric information.

Figure 8A:
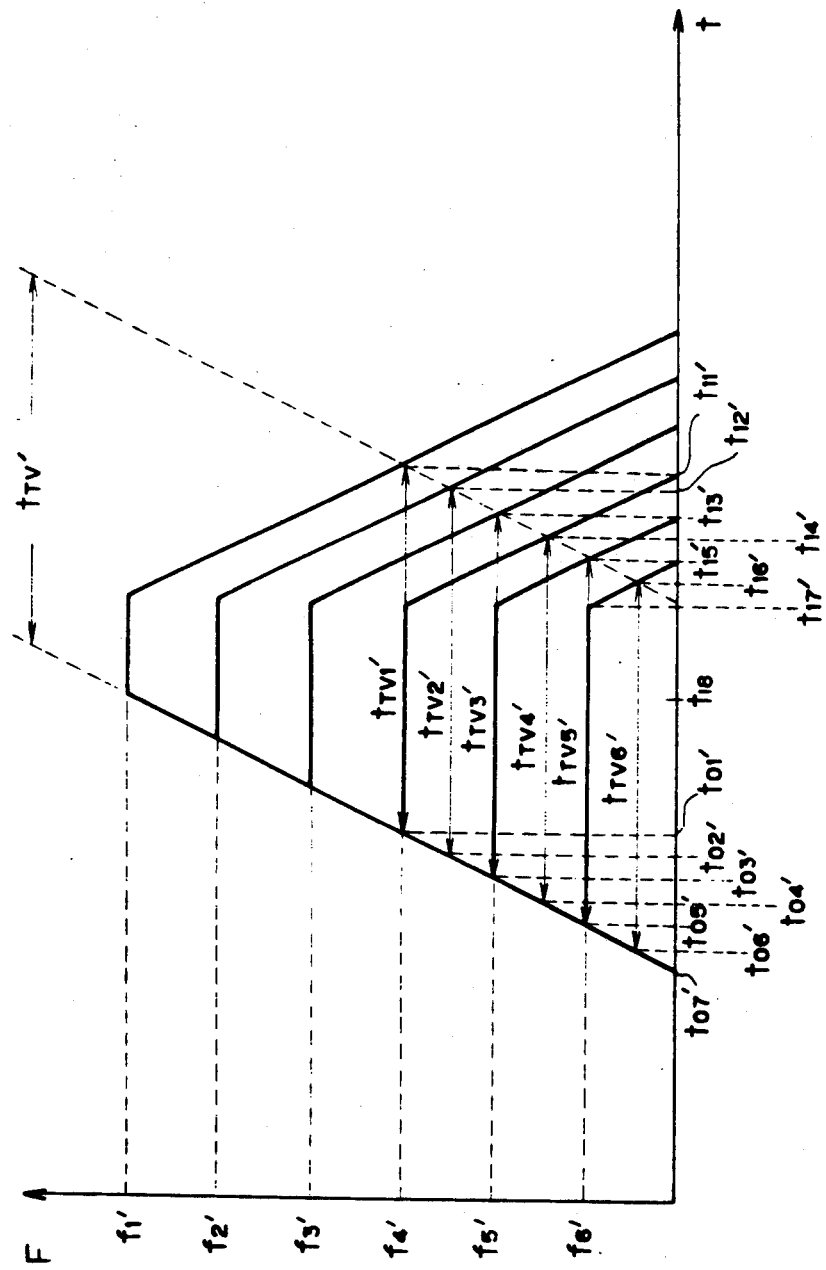
FIG. 8a is a view showing the shape of an aperture when a photographing mode is set with respect to a picture image on the television screen in a camera in a second embodiment of the present invention.

FIG. 8a is a view of the shape of an aperture showing the relation between time t and diaphragm F when the television mode is set. Items trigger switch to (h) in FIG. 8b show timing charts of constructional portions in the camera corresponding to FIG. 8a when the diaphragm is set to $f_1'$ showing a maximum aperture.

Figure 8B:
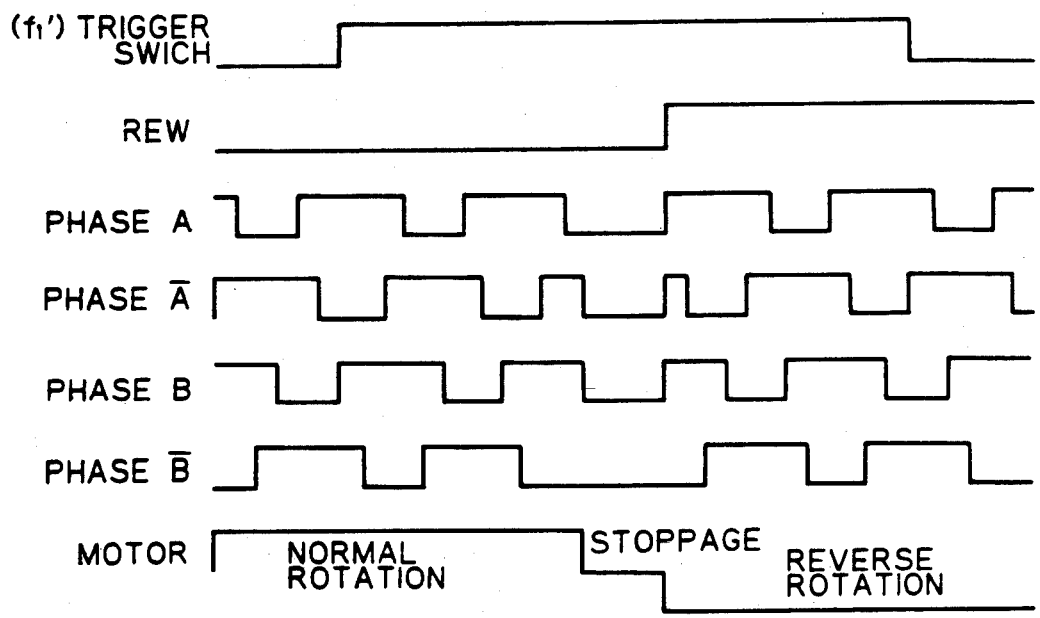
FIG. 8b and FIG. 8c are timing charts of constructional portions in the camera in the second embodiment of the present invention.

As can be seen from items phase A to phase $\overline{B}$ in FIG. 8b, driving electric currents flowing through windings of respective phases of the step motor are switched every two pulses and the windings are sequentially excited in an order of A, B, $\overline{A}$ and $\overline{B}$. Thus, the step motor 36 is rotated in the counterclockwise direction half a step angle in the above two-phase exciting system. Rotary force of the step motor is transmitted to a driving gear 34 through an output gear 35 and the step motor is then rotated in the reverse direction. A pin 34a pushes a handle portion 33b of a lever 33 and elongated holes 32e and 32f are moved by the pin 33a of the lever 33. Thus, the shutter blades 32a and 32b begin to be opened at time point $t_{07}'$ in an exciting process of phase A.

Simultaneously, as shown by item trigger switch in FIG. 8b, the trigger switch 37 is turned on and outputs an open signal at a high voltage level. The shutter aperture is sequentially opened every time when the windings of the step motor 36 are sequentially excited in an order of phases B, $\overline{A}$, $\overline{B}$, — from the generating time point $t_{07}'$ of the open signal of the trigger switch 37. Namely, the shutter aperture is sequentially opened every one of time points $t_{06}'$ to $t_{01}'$. As shown by item (h) in FIG. 8, the rotation of the step motor 36 is stopped at time point $t_1'$ in an exciting process of phase B. The maximum diaphragm $f_1'$ is maintained between time points $t_1'$ and $t_{17}'$.

As shown by items REW and motor in FIG. 8b, the step motor 36 is rotated in the reverse direction at time point $t_{17}'$ so that the shutter begins to be closed. The exposure time $t_{TV1}'$ in the television mode in the case of diaphragm $f_1'$ is equal to $t_{11}' - t_{01}'$.

Diaphragm $f_1'$ shows a case in which the photographed object is darkest. Diaphragm $f_6'$ shows a case in which the photographed object is brightest as shown by items trigger switch to motor in FIG. 8c.

In this case, as mentioned above, the step motor 36 is rotated half a step angle in the two-phase exciting system. The rotary force of the step motor 36 is transmitted to the driving gear 34 through the output gear 35. The pin 34a pushes the handle portion 33b of the lever 33 and the pin 33a pushes the elongated holes 32e and 32f. Thus, the shutter blades 32a and 32b are opened at time point $t_{07}'$ for starting the excitation of phase B in the exciting process of phase A of the step motor 36.

Figure 8C:
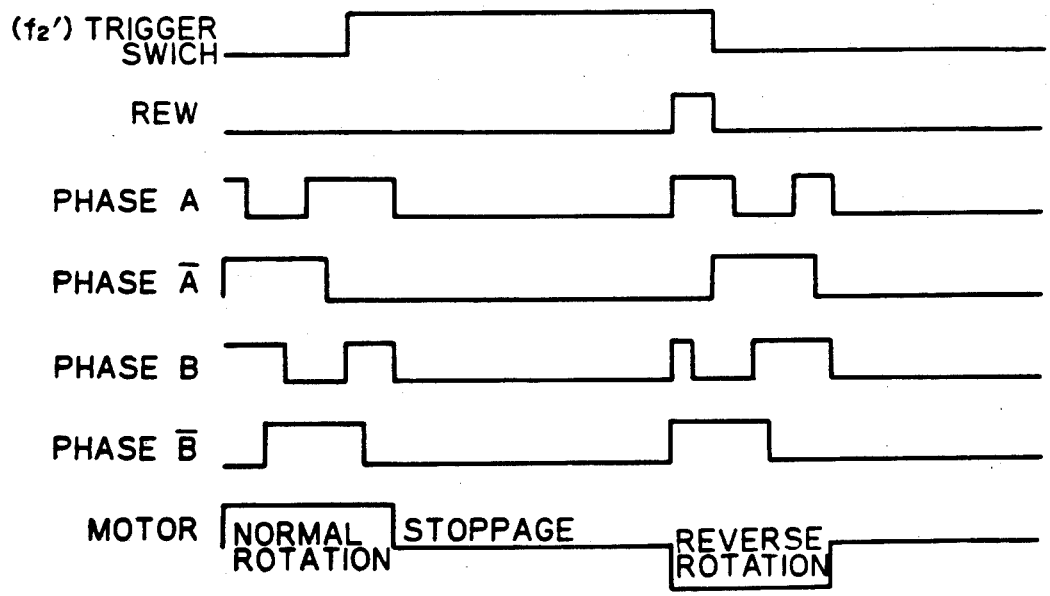

Thus, as shown by item trigger switch in FIG. 8c, the trigger switch 37 outputs an open signal at a high voltage level at time point $t_{07}'$. As shown by item motor in FIG. 8c, the rotation of the step motor 36 is stopped at time point $t_{05}'$. The shutter blades 32a and 32b are opened with diaphragm $f_6'$ between time points $t_{05}'$ and $t_{17}'$. As shown by item REW in FIG. 8c, a reverse rotation pulse is outputted at time point $t_{17}'$. Thus, the step motor 36 is rotated in the reverse direction as shown by item motor in FIG. 8c so that the shutter begins to be closed.

Exposure time $t_{TV6}'$ in the television mode in the case of diaphragm $f_6'$ is equal to $t_{16}' - t_{06}'$.

Similar to the above case, exposure times $t_{TV2}'$ to $t_{TV5}'$ in the case of the other diaphragms $f_2'$ to $f_5'$ are provided as follows.

$$t_{TV2}' = t_{12}' - t_{02}'$$

$$t_{TV5}' = t_{15}' - t_{05}'$$

As can be seen from FIG. 8a, the following formulas are obtained.

$$\begin{aligned}
t_{TV}' &= t_{TV1}' = t_{TV2}' = t_{TV3}' \\
&= t_{TV4}' = t_{TV5}' = t_{11}' - t_{01}' \\
&= t_{12}' - t_{02}' = t_{13}' - t_{03}' \\
&= t_{14}' - t_{04}' = t_{15}' - t_{05}' \\
&= t_{16}' - t_{06}'
\end{aligned}$$

Diaphragms $f_1'$ to $f_6'$ satisfy the following relation.

$$f_1' > f_2' > f_3' > f_4' > f_5' > f_6' \quad \text{(a)}$$

Exposure value $Evn' = (fn'/2) \times t_{TV}'$ is provided. Exposure values $Ev1'$ to $Ev6'$ with respect to diaphragms $f_1'$ to $f_6'$ satisfy the following relation.

$$Ev1' > Ev2' > Ev3' > Ev4' > Ev5' > Ev6' \quad \text{(b)}$$

Accordingly, the change in exposure value in a photographing mode of a picture image on the television screen provided by the same driving system as the normal photographing mode shown in FIG. 2 is provided as follows from the above formula (a).

$$\Delta Ev = Evn/Evn + 1$$

As can be seen from the comparison of FIG. 2a and FIG. 8a, the relation between the change $\Delta Ev$ in exposure value in the television photographing mode provided by the same driving system as the normal photographing mode, and the change $\Delta Ev'$ in exposure value in the television photographing mode in the present invention is provided as follows.

$$\Delta Ev : \Delta Ev' = 2:1$$

Namely, in the case of FIG. 2a, the diaphragm is changed at three stages $f_3$ to $f_1$. In contrast to this, in the case of FIG. 8a in accordance with the second embodiment of the present invention, it is possible to change the diaphragm at six stages $f_6'$ to $f_1'$. Therefore, it is possible to finely control the diaphragm with doubled accuracy.

As mentioned above, in the second embodiment of the present invention, the driving system of the step motor 36 is switched from the two-phase exciting system to the one-phase/two-phase exciting system in the photographing mode with respect to a picture image on the television screen. Accordingly, a rotary step of the step motor is finely changed to control only the diaphragm with higher resolution in accordance with an exposure amount at a constant shutter time suitable for photographing the picture image on the television screen. Therefore, it is possible to photograph the picture image at an exposure value optimum for changing brightness of the picture image on the television screen at any time.

The present invention is not limited to the first and second embodiments, but can be changed in various kinds of modifications within the scope of the features of the invention.

For example, in the above case, the driving system of the step motor 36 is switched from the two-phase exciting system to the one-phase/two-phase exciting system in the photographing mode with respect to a picture image on the television screen. However, another exciting system such as two-phase/three-phase exciting system may be used.

As mentioned above, in accordance with the present invention, an exposure amount in accordance with photometric information from a photometric means is calculated by a calculator in a television mode. The exposure amount is converted to the number of steps of the step motor provided until a diaphragm value corresponding to this exposure amount after an open signal of a trigger switch is generated. A time until the reverse rotation of the step motor is set to a shutter time suitable for photographing a picture image on the television screen. Accordingly, the operation of a diaphragm can be controlled while the shutter time suitable for photographing the picture image on the television screen is preferentially set without increasing the number of parts. Thus, it is possible to provide a camera having a television mode in which the picture image can be photographed at a suitable exposure value based on the photometric information and corresponding to the changing brightness of the picture image on the television screen.

Further, in accordance with the present invention, it is possible to set a time corresponding to the number of steps provided until the step motor is rotated in the reverse direction after the open signal of the trigger switch is generated in the television mode. Accordingly, in addition to the above effects, it is possible to provide a camera having a television mode in which the picture image on the television screen can be photographed with high exposure accuracy.

Further, in accordance with the present invention, the number of steps or a step angle is changed by changing the exciting system of the step motor when the photographing mode with respect to the television image on the television screen is set. Thus, a constant shutter time suitable for photographing the picture image on the television screen is set. Further, it is possible to finely change the diaphragm in accordance with the exposure amount based on the photometric information from the photometric means and film sensitivity information, thereby finely controlling an exposing operation.

Accordingly, it is possible to photograph the picture image on the television screen having the changing brightness at an optimum exposure value. Furthermore, it is possible to provide a camera having a television mode without increasing the cost thereof since the number of special mechanical parts is not increased.

Many widely different embodiments of the present invention may be constructed without departing from the spirit and scope of the present invention. It should be understood that the present invention is not limited to the specific embodiments described in the specification, except as defined in the appended claims.

What is claimed is:

1. A camera having a television mode comprising:
   a shutter unit for opening and closing a plurality of shutter blades used as a shutter and a diaphragm by rotating a step motor in normal and reverse directions;
   photometric means for performing a photometric operation with respect to a photographed object;
   mode switching means for selectively switching a television mode for photographing a picture image on a television screen and a normal mode for performing a normal photographing operation;
   a trigger switch for outputting an open signal in synchronization with an operation for opening said shutter blades and outputting a closed signal in synchronization with an operation for closing said shutter blades; and
   a calculator for calculating an exposure amount by photometric information provided by said photometric means when the normal photographing mode is selected by said mode switching means;
   said calculator converting the calculated exposure amount to a time from a generating time point of the open signal of said trigger switch to a time point of the reverse rotation of said step motor so as to control a program exposing operation with respect to said shutter unit;
   said calculator calculating the exposure amount by the photometric information provided by said photometric means when said television mode is selected.

2. A camera as claimed in claim 1, wherein said calculator converts the calculated exposure amount to the number of driving steps from the generating time point of the open signal of said trigger switch to stoppage of the rotation of said step motor.

3. A camera as claimed in claim 2, wherein said calculator sets the time from said generating time point of the open signal to the time point of the reverse rotation of the step motor to a time suitable for photographing the picture image on the television screen so as to open and close the shutter by said shutter unit.

4. A camera as claimed in claim 1, wherein said calculator sets a reverse rotation time corresponding to the number of driving steps from the generating time point of the open signal of said trigger switch to a start time point of the reverse rotation of said step motor when said television mode is set.

5. A camera having a television mode comprising:
   a shutter unit for opening and closing a plurality of shutter blades used as a shutter and a diaphragm by rotating a step motor in normal and reverse directions;
   photometric means for performing a photometric operation with respect to a photographed object;
   mode switching means for selectively switching a television mode for photographing a picture image on a television screen and a normal mode for performing a normal photographing operation;
   a trigger switch for outputting an open signal in synchronization with an operation for opening said shutter blades and outputting a closed signal in synchronization with an operation for closing said shutter blades; and
   a calculator for calculating an exposure amount by photometric information provided by said photometric means when the normal photographing mode is selected by said mode switching means;
   said calculator converting the calculated exposure amount to a time from a generating time point of the open signal of said trigger switch to a time point of the reverse rotation of said step motor so as to control a program exposing operation with respect to said shutter unit;
   said calculator calculating the exposure amount by the photometric information provided by said photometric means when said television mode is selected;
   said calculator converting the calculated exposure amount to the number of driving steps from the generating time point of the open signal of said trigger switch to stoppage of the rotation of said step motor;
   said calculator setting the time from said generating time point of the open signal to the time point of the reverse rotation of the step motor to a time suitable for photographing the picture image on the television screen so as to open and close the shutter by said shutter unit.

6. A camera as claimed in claim 5, wherein said calculator sets a reverse rotation time corresponding to the number of driving steps from the generating time point of the open signal of said trigger switch to a start time point of the reverse rotation of said step motor when said television mode is set.

7. A camera having a television mode comprising:
   a shutter unit for opening and closing a plurality of shutter blades used as a shutter and a diaphragm by rotating a step motor in normal and reverse directions;
   photometric means for performing a photometric operation with respect to a photographed object;
   mode switching means for selectively switching a television mode for photographing a picture image on a television screen and a normal mode for performing a normal photographing operation by an external operation of the camera;
   a trigger switch for outputting an open signal in synchronization with an operation for opening said shutter blades and outputting a closed signal in synchronization with an operation for closing said shutter blades; and means for calculating an exposure amount by photometric information provided by said photometric means when the normal photographing mode is selected by said mode switching means;

said calculating means converting the calculated exposure amount to a time in accordance with the exposure amount from a generating time point of the open signal of said trigger switch to a time point of the reverse rotation of said step motor so as to control an exposing operation with respect to said shutter unit;

said calculating means calculating the exposure amount by the photometric information provided by said photometric means when said television mode is selected;

said calculating means converting the calculated exposure amount to the number of motor steps counted from the generating time point of the open signal of said trigger switch, said calculating means further converting the calculated exposure amount to a time from said generating time point of the open signal to the time point of the reverse rotation of said step motor.

8. A camera as claimed in claim 7, wherein said calculating means controls the exposing operation with respect to said shutter unit by changing an exciting state of said step motor so as to reduce a step angle of said step motor.

9. A camera having a television mode comprising:

a shutter unit for opening and closing a plurality of shutter blades used as a shutter and a diaphragm by rotating a step motor in normal and reverse directions;

photometric means for performing a photometric operation with respect to a photographed object;

mode switching means for selectively switching a television mode for photographing a picture image on a television screen and a normal mode for performing a normal photographing operation by an external operation of the camera;

a trigger switch for outputting an open signal in synchronization with an operation for opening said shutter blades and outputting a closed signal in synchronization with an operation for closing said shutter blades; and means for calculating an exposure amount by photometric information provided by said photometric means when the normal photographing mode is selected by said mode switching means;

said calculating means converting the calculated exposure amount to a time in accordance with the exposure amount from a generating time point of the open signal of said trigger switch to a time point of the reverse rotation of said step motor so as to control an exposing operation with respect to said shutter unit;

said calculating means calculating the exposure amount by the photometric information provided by said photometric means when said television mode is selected;

said calculating means converting the calculated exposure amount to the number of motor steps counted from the generating time point of the open signal of said trigger switch, said calculating means further converting the calculated exposure amount to a time from said generating time point of the open signal to the time point of the reverse rotation of said step motor;

said calculating means controlling the exposing operation with respect to said shutter unit by changing an exciting state of said step motor so as to reduce a step angle of said step motor.

* * * * *